US008103951B2

(12) United States Patent
Schuller et al.

(10) Patent No.: US 8,103,951 B2
(45) Date of Patent: Jan. 24, 2012

(54) DYNAMIC SCHEMA CREATION

(75) Inventors: Geoff Schuller, San Jose, CA (US); Yan Guo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 12/241,720

(22) Filed: Sep. 30, 2008

(65) Prior Publication Data

US 2010/0083092 A1  Apr. 1, 2010

(51) Int. Cl.
*G06F 17/00* (2006.01)
*G06F 17/30* (2006.01)

(52) U.S. Cl. ........ 715/227; 715/212; 715/770; 707/803; 707/999.101

(58) Field of Classification Search .......... 715/200–202, 715/205, 209, 210, 212, 213, 226, 227, 229, 715/231, 234, 255, 256, 273, 274, 760, 762; 707/600, 602, 705, 803, 912, 964, 999.001, 707/999.01, 999.1, 999.101, 999.102
See application file for complete search history.

(56) References Cited

U.S. PATENT DOCUMENTS

| 6,108,664 | A | * | 8/2000 | Nori et al. ............................. 1/1 |
| 6,151,608 | A | * | 11/2000 | Abrams ........................ 707/679 |
| 6,591,295 | B1 | * | 7/2003 | Diamond et al. ............. 709/217 |
| 6,613,099 | B2 | * | 9/2003 | Crim ............................ 715/210 |
| 6,639,611 | B1 | * | 10/2003 | Leduc ........................... 715/764 |
| 7,668,870 | B1 | * | 2/2010 | Sykes et al. ................. 707/999.2 |
| 7,689,925 | B2 | * | 3/2010 | Hahn et al. .................... 715/770 |
| 7,716,168 | B2 | * | 5/2010 | Selca et al. ............................. 1/1 |
| 2007/0005630 | A1 | * | 1/2007 | Selca et al. .................... 707/102 |

* cited by examiner

*Primary Examiner* — Maikhanh Nguyen
(74) *Attorney, Agent, or Firm* — Fish & Richardson P.C.

(57) ABSTRACT

In a database application executing on a computer system, a database table view is represented by a structured object located on a storage device coupled to the computer system. Responsive to a user pasting content (e.g., spreadsheet data) onto the view of the table, the database application determines if the content to be pasted extends beyond the number of rows (records in a database) or columns (database fields) currently displayed in the table view. If the content extends beyond the number of rows or columns currently displayed, the database application automatically adds one or more records or fields to the structured object on the storage device, and updates the table view to display one or more rows or columns corresponding to the records or fields added to the structured object.

6 Claims, 10 Drawing Sheets

DYNAMIC SCHEMA CREATION

TECHNICAL FIELD

This subject matter is generally related to database creation and management.

BACKGROUND

Users often desire to populate a database table in a database application by copying data from another application (e.g., a spreadsheet) and pasting that information into the database table. If a data block to be pasted has more rows or columns than is defined by the current schema for the database table, the user must perform a set of procedures to add additional records and fields to accommodate the rows and columns in the data block to be pasted. Such procedures can be tedious and time consuming for some users.

SUMMARY

In a database application executing on a computer system, a database table view is represented by a structured object located on a storage device coupled to the computer system. Responsive to a user pasting content (e.g., spreadsheet data) onto the view of the table, the database application determines if the content to be pasted extends beyond the number of rows (records in a database) or columns (database fields) currently displayed in the table view. If the content extends beyond the number of rows or columns currently displayed, the database application automatically adds one or more records or fields to the structured object on the storage device, and updates the table view to display one or more rows or columns corresponding to the records or fields added to the structured object.

DETAILED DESCRIPTION

Example Workflows For Dynamic Creation of Database Schema

Figure 1:
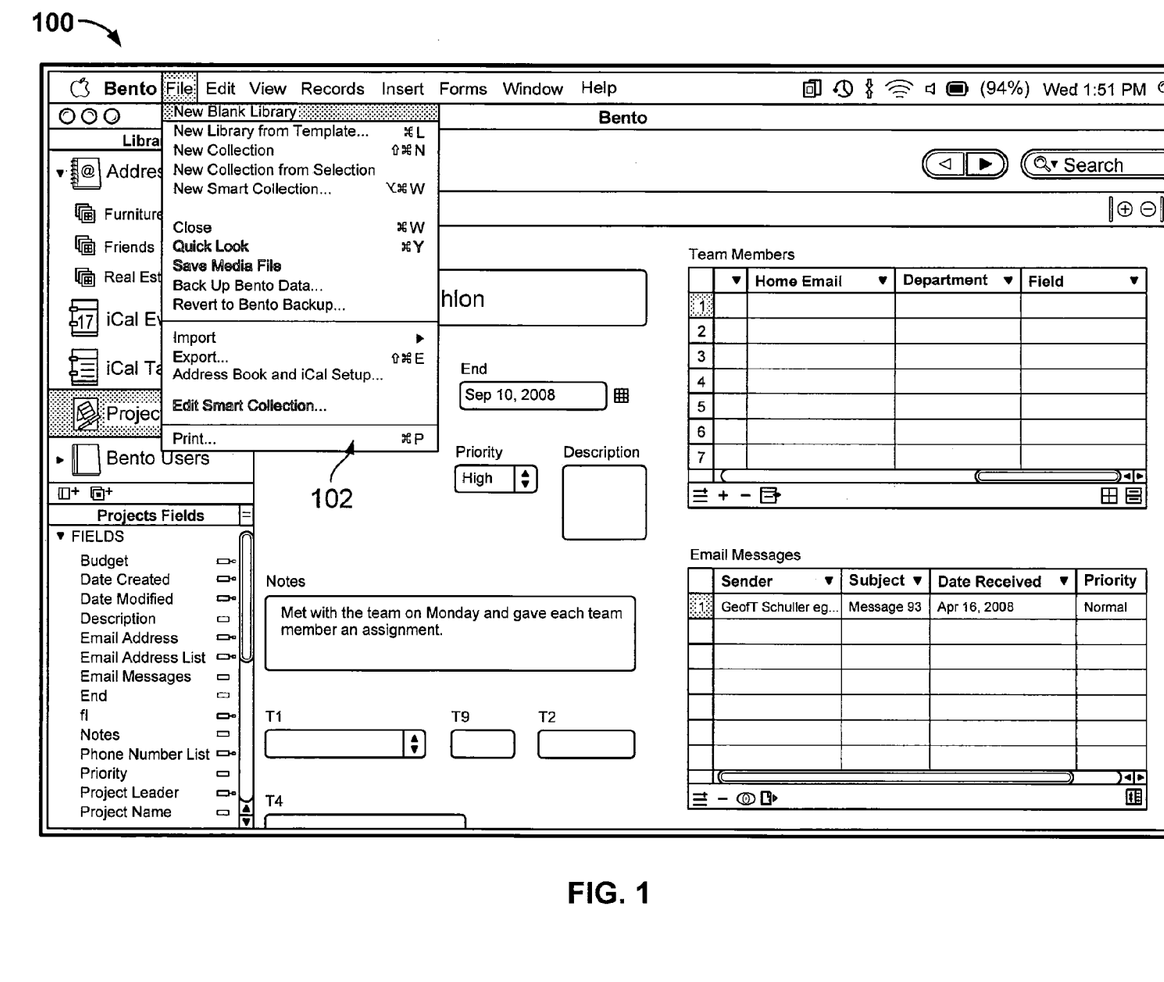
FIGS. 1-8 are example screenshots illustrating an example workflow for dynamic creation of database schema.

Referring to FIG. 1, a screenshot 100 of a database application executing on a computer system is shown. In this example, the user has selected a New Blank Library command from a menu 102. Selection of the New Blank Library command causes a new table to be created and displayed by the database application. The New Blank Library command allows the user to make a new database library, starting with one cell where the user can either begin by pasting copied content or by typing to add data.

Figure 2:
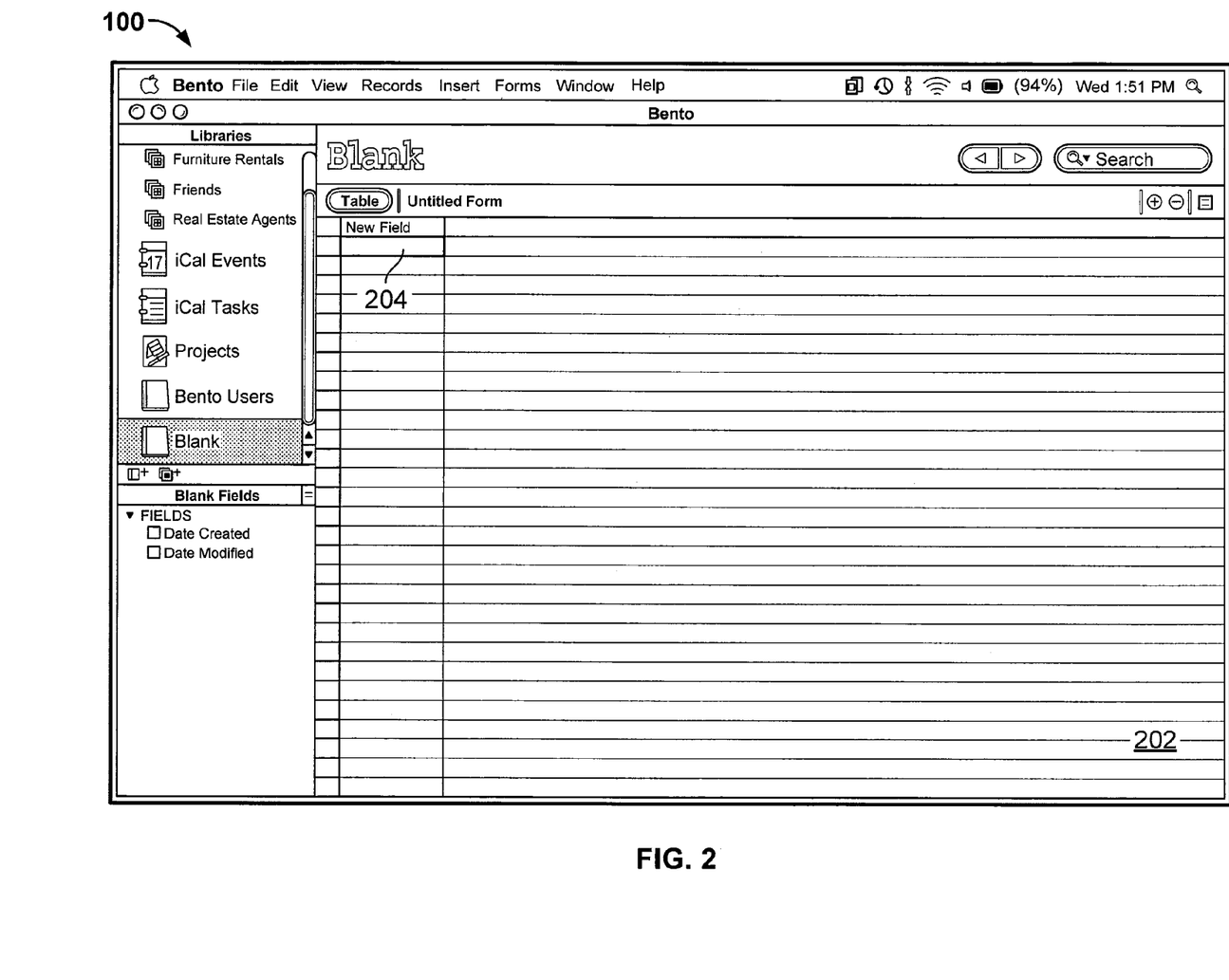

FIG. 2 shows a New Blank library 202 with a cell 204 labeled "New Field." The user enters the text "Bob" into the cell 204 using a keyboard coupled to the computer system, then presses a key (e.g., a tab key). The act of entering text in the cell 204 and pressing a key (e.g., the tab key) creates the result shown in FIG. 3.

Figure 3:
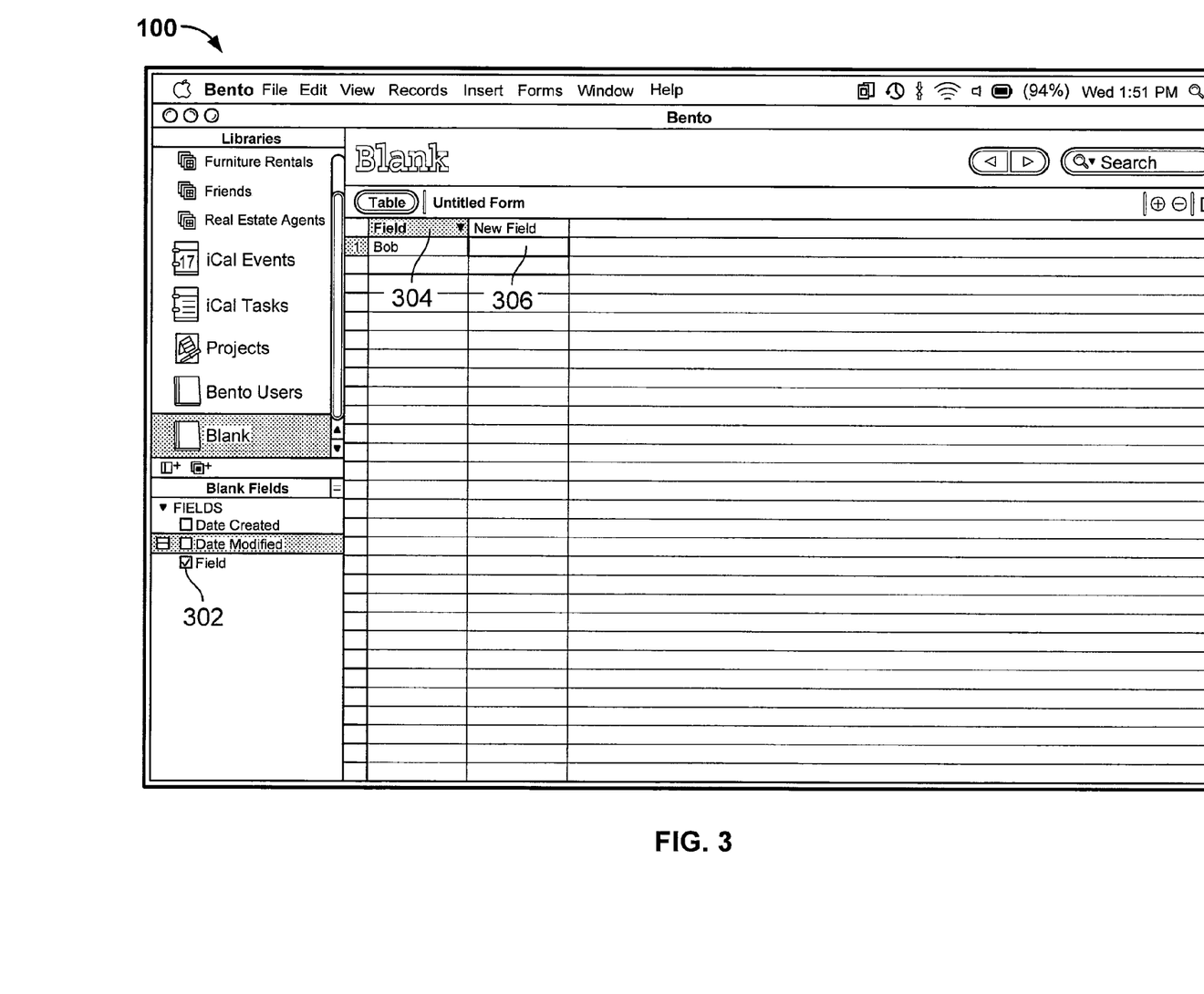

Referring to FIG. 3, a field is created in the structured object "Blank library" and named "Field," as seen in a column header 304 and fields list 302. The value "Bob" is stored in it. The cursor automatically moves to the empty column 306 located to the right of Field to allow the user to enter another value. When the user enters another value (e.g., by typing or pasting, and the pressing the tab key), another field is created in the structured object, and a blank column is displayed to the right, to allow the user to enter more data.

Figure 4:
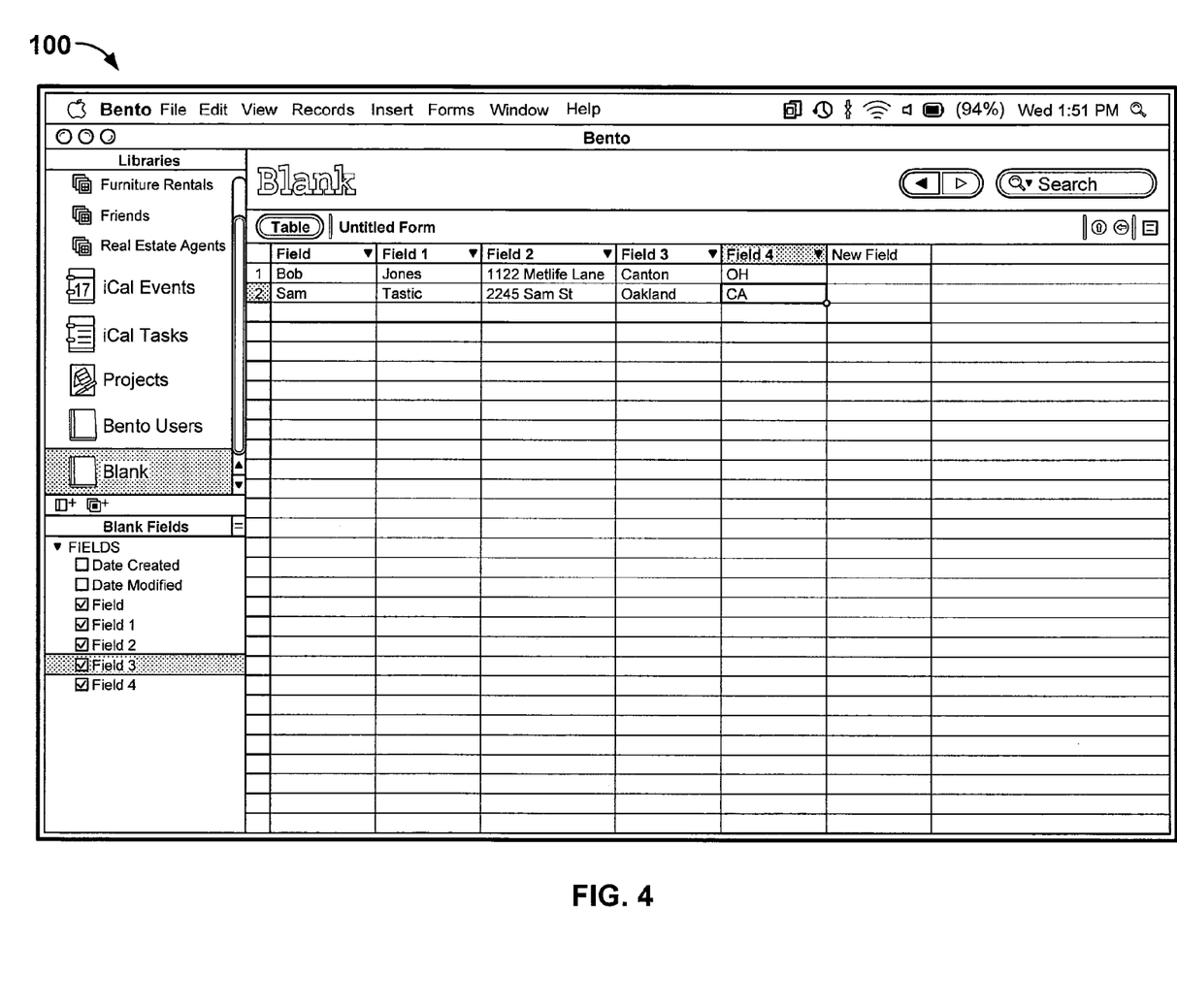

FIG. 4 shows the Blank library after a user has created four fields using the technique described above. In the example shown, the user has created two records for Blank library: one for Bob and one for Sam. The first two columns (Field, Field 1) store a first name and last name. The last three fields (Field 2, Field 3, Field 4) store addresses associated with the names (e.g., address, city, state).

Figure 5:
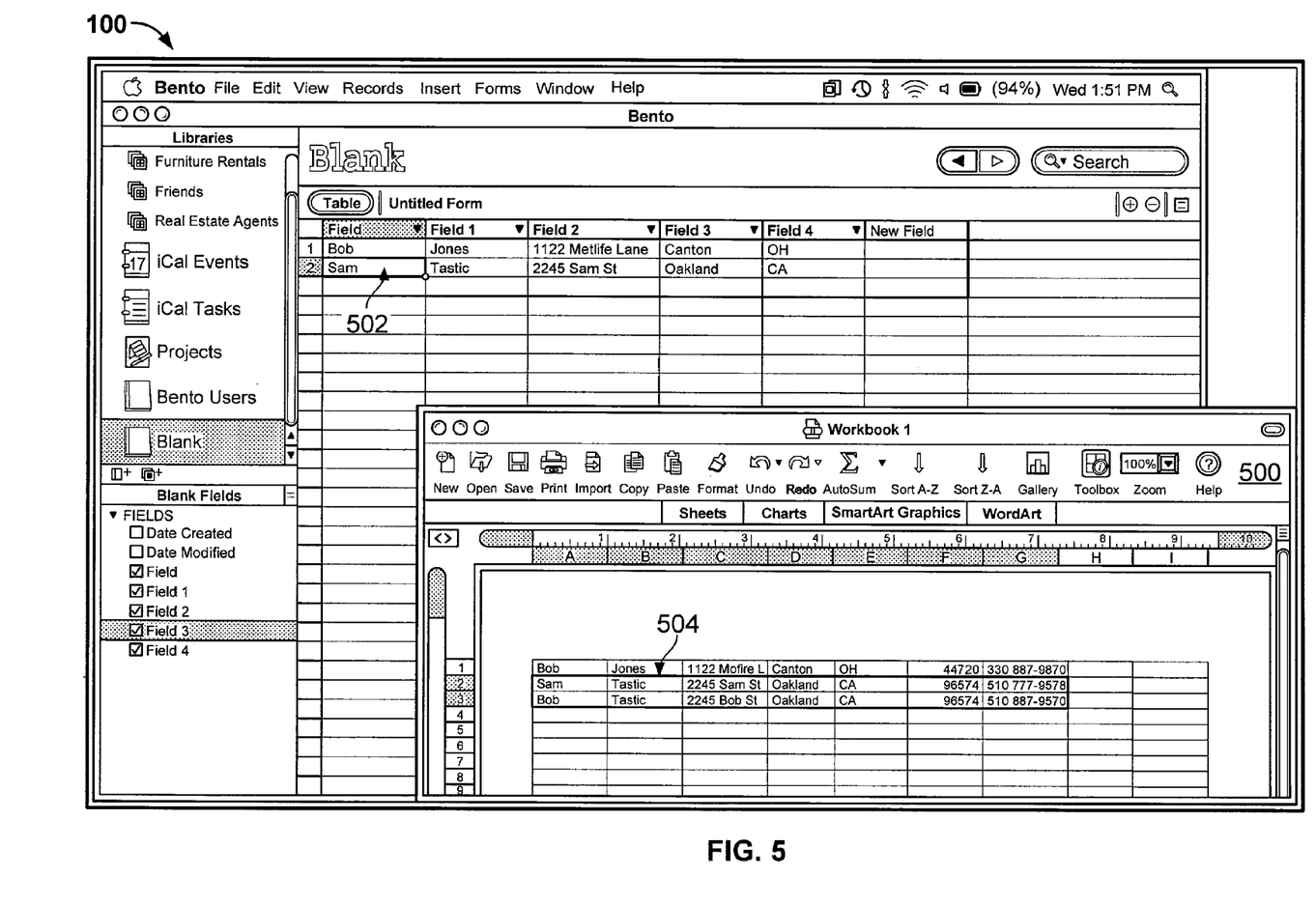

Referring to FIG. 5, the user has opened another application to copy data from. In this example, the user opened a spreadsheet application 500. Other data sources can also be copied by the user, such as an address book or another database application. In this example, the user intends to copy and paste a data block 504 from the spreadsheet application 500 and past the data block 504 onto the table view of the database application. The user highlights the data block 504 in the spreadsheet application and either copies the data block 504 from the spreadsheet 500 and pastes it beginning at cell 502 in the database application, or drags the selected data block 504 and drops it in the database at cell 512. Note that there is only 1 record and 5 fields extending down and to the right from cell 502. The copied data block 504 includes two records with seven fields each. The two additional fields are used for storing a zip code and a phone number associated with the names Bob Tastic and Sam Tastic. The user copies and pastes the data block 504 onto the table view of the database application at cell 502. The data block 504, however, has more columns then is currently displayed in the table view.

Figure 6:
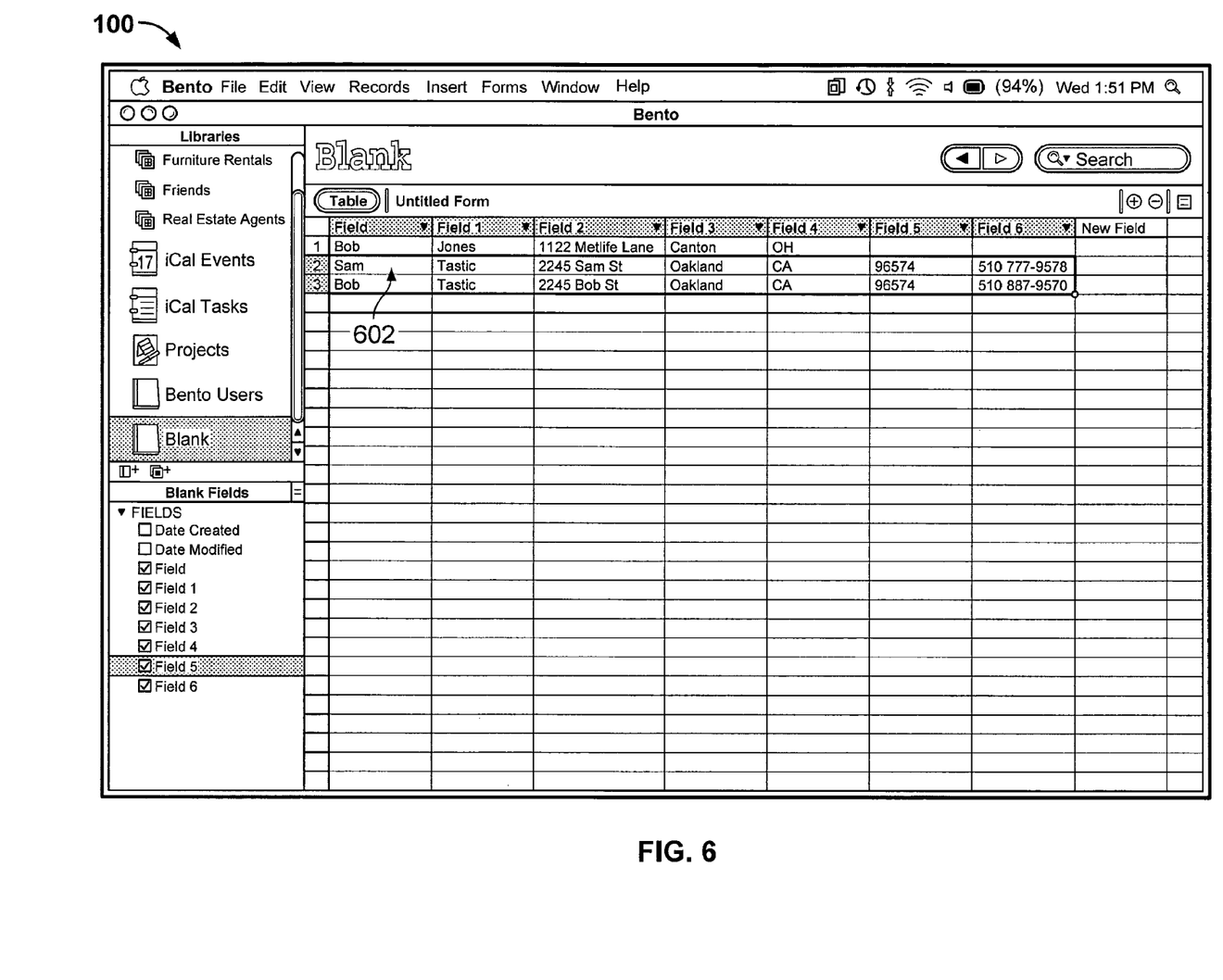

Referring to FIG. 6, a result of the copy and paste operation is shown. The field values 602 displayed in the table view (five fields) are replaced with corresponding fields in the data block 504. In this example, the database application replaces the values in the existing rows and columns (row 2, the first 5 columns) and creates a new row (a database record) plus two new columns (database fields) to accommodate the additional two columns in the data block 504. Thus, the database application automatically creates additional rows and columns in the table view when the content being pasted extends beyond the number of rows or columns currently displayed in the table view. It is important to note that in addition to modifying the table view to display the additional rows and columns, the database schema for Blank library was also modified to include the additional rows and columns.

Figure 7:
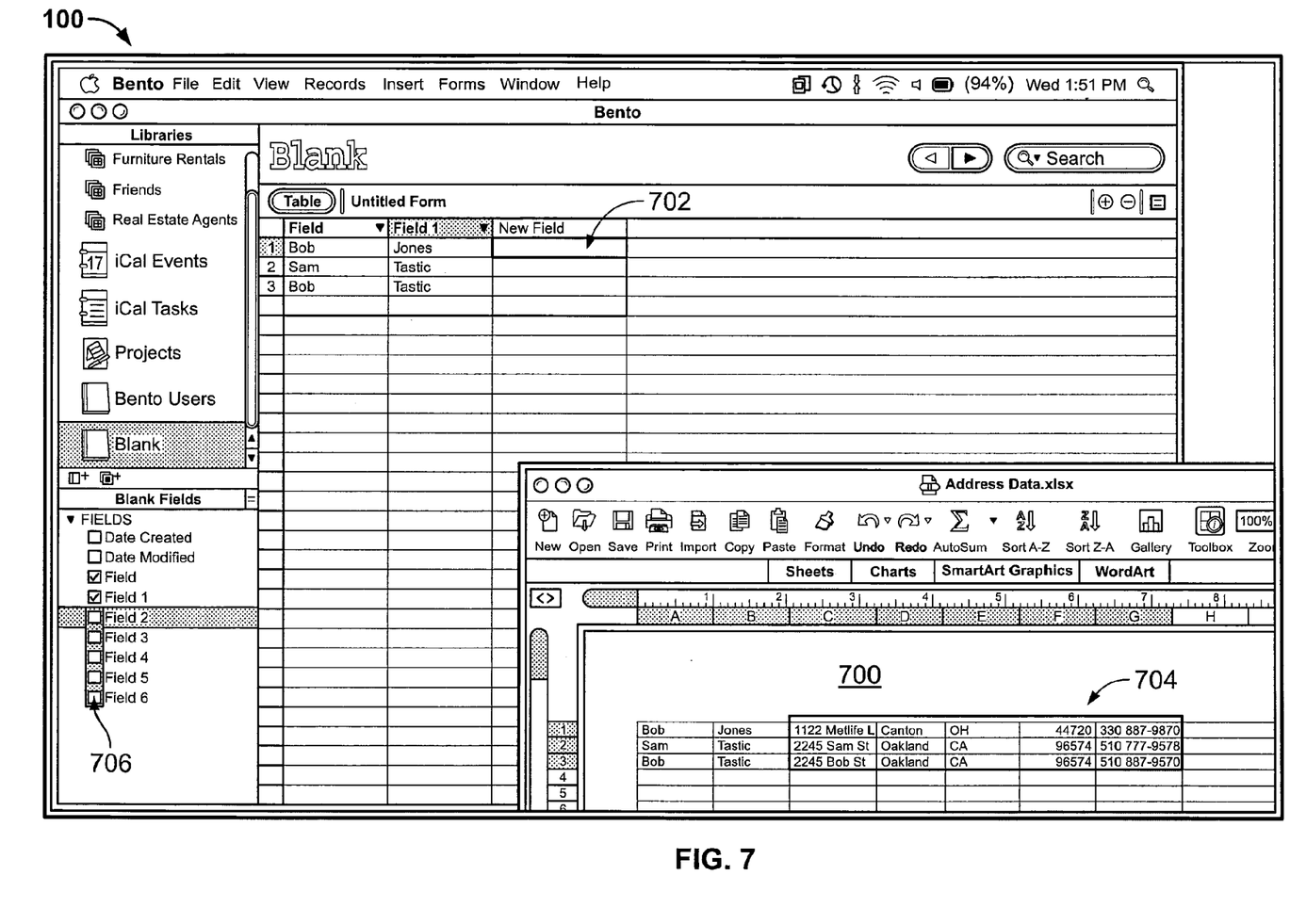

Referring to FIG. 7, in another example the user has hidden some fields by deselecting those fields checkboxes in the field list 706. The deselected fields (e.g., fields 2-6) are no longer displayed in the table view. The deselected fields, however, are still part of the database schema for Blank library. The user copies and pastes a data block 704 into the table view at cell 702.

Figure 8:
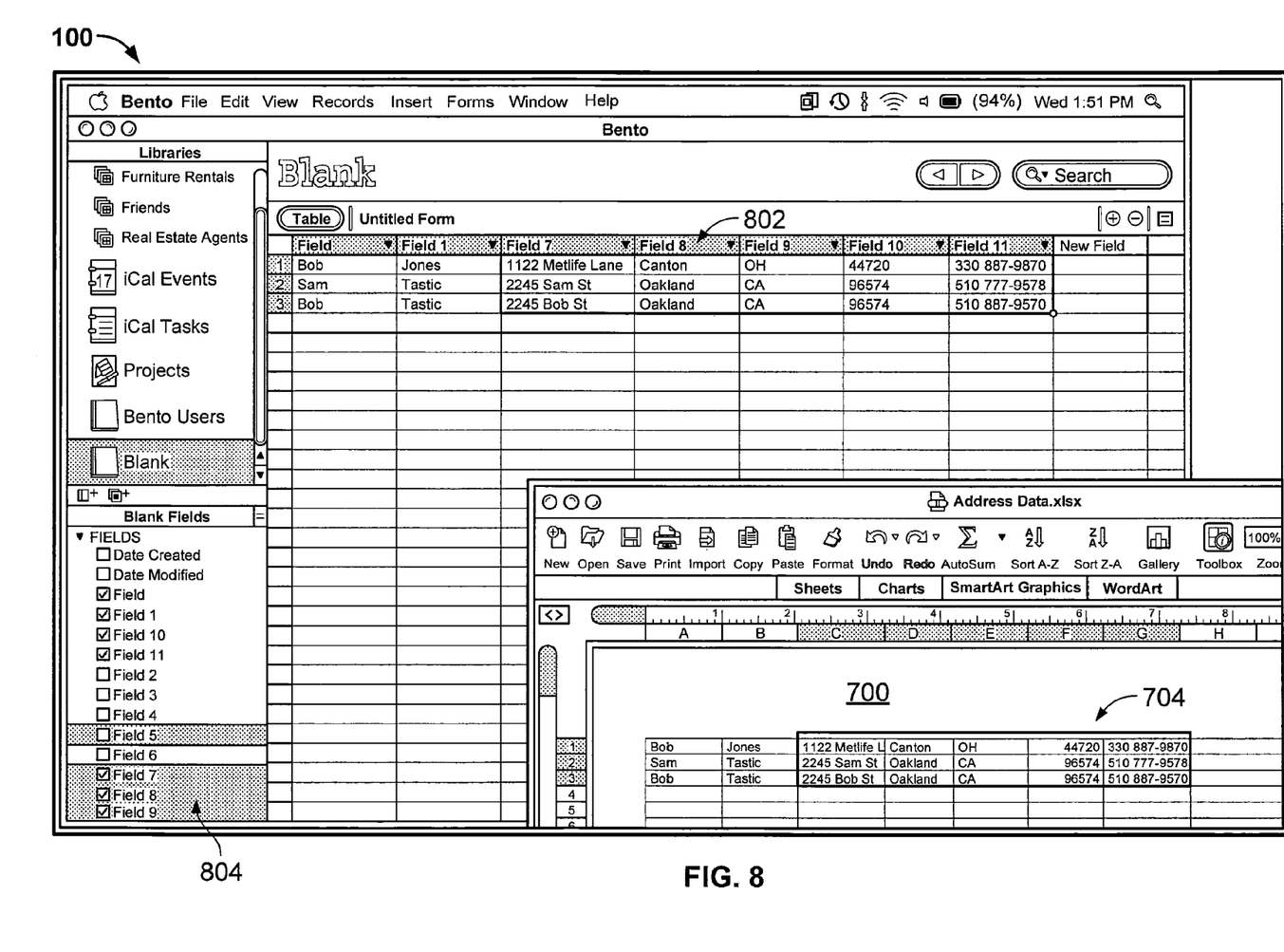

FIG. 8 shows the result of the paste operation, where the database application creates a new set of fields so that the 5-column data block 704 pasted can be stored and displayed. Note that the new fields are labeled Fields 7-11, since the existing data schema for Blank library has Fields 0-5.

Example Process for Dynamic Creation of Database Schema

Figure 9:
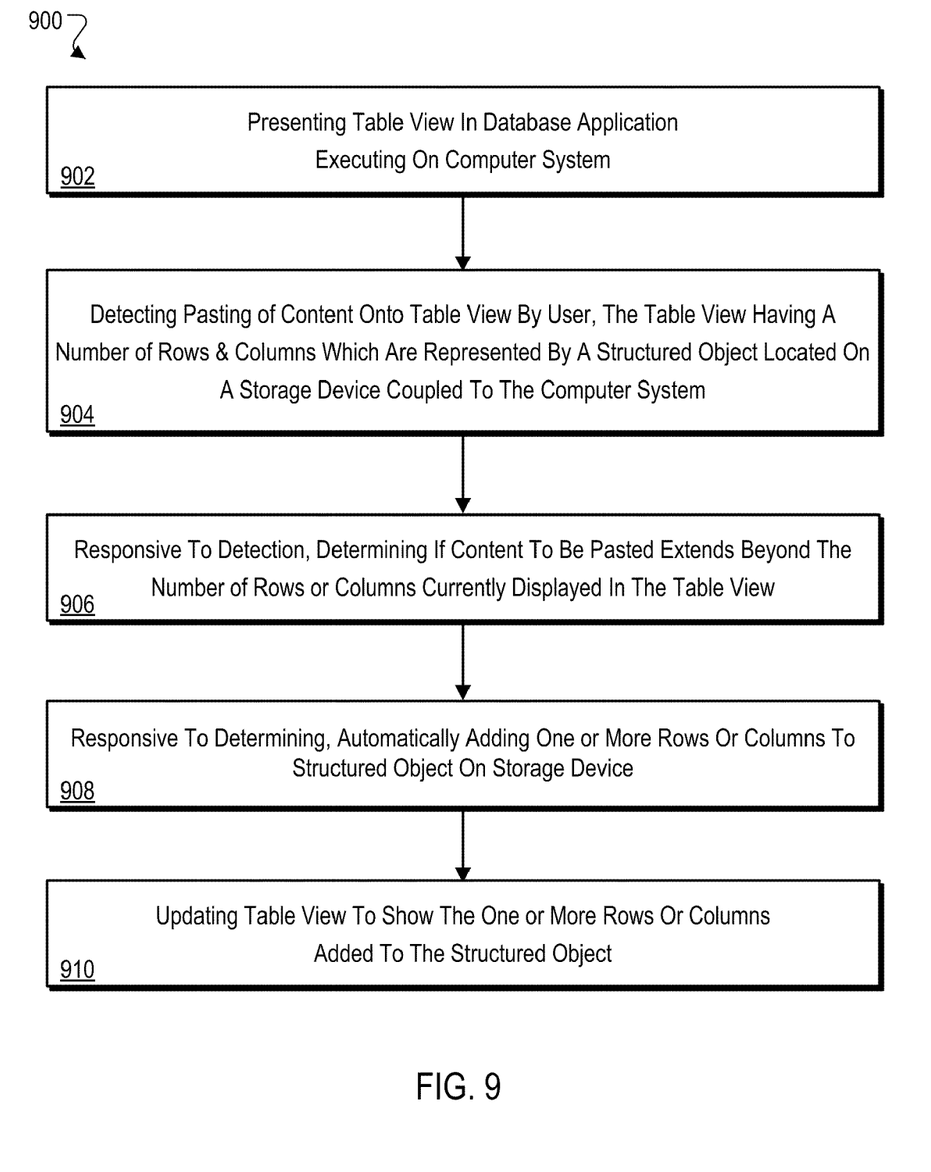
FIG. 9 is a flow diagram of an example process for dynamic creation of database schema.

FIG. 9 is a flow diagram of an example process 900 for dynamic creation of database schema. In some implementations, the process 900 begins by presenting a table view in a database application executing on a computer system (902). The database application detects a user pasting content (e.g., a data block) onto the table view (904). The table view has a number of rows and columns which can be represented by a structured object located on a storage device coupled to the computer system.

The database application determines if the content to be pasted extends beyond the number of rows and columns currently displayed in the table view (906). In some implementations, the determining includes counting the number of rows and columns of the data block copied to a "clipboard," and how many rows and columns are displayed below and to the right of the cell where the paste begins in the table view. In some implementations, the paste begins at the location of the cursor when the paste operation is performed.

The database application automatically adds one or more rows (stored as records) or columns (stored as fields) to the structured object on the storage device coupled to the computer system (908). Adding additional rows or columns to the structured object allows the data block to be copied, stored and displayed in the table view.

After the structured object (also referred to as "database schema") is modified, the table view is updated to show the one or more rows or columns added to the structured object (910).

The process 900 described above allows a user to easily paste data into a database table without having to manually create additional records and/or fields first, as is often required by conventional database applications.

Data Type Detection

In some implementations, the database application can detect a data type associated with the content to be pasted, then automatically modifies the structured object based on the data type. For example, after the user performs a copy operation, the content on the clipboard can be examined to determine its data type (e.g., integer, text). The data in each "column" of the clipboard data is inspected. If a single column contains values of one consistent type (e.g., integer) the field that is created as the result of the past operation will be set to the proper type (e.g., integer) in the structured object.

Example System for Dynamic Creation of Database Schema

Figure 10:
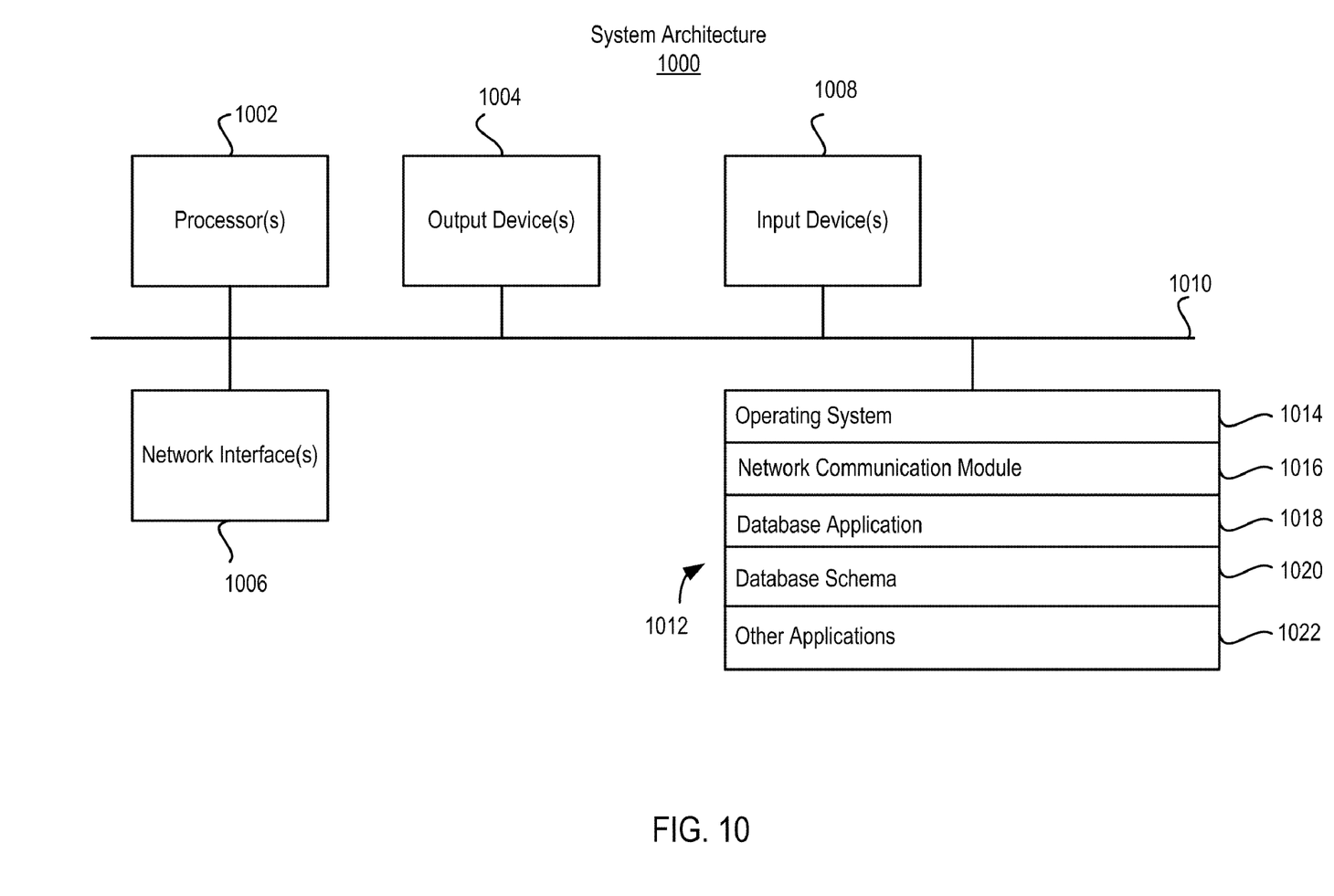
FIG. 10 is a block diagram of example system for implementing the workflows and process described in reference to FIGS. 1-9.

FIG. 10 is a block diagram of example system architecture 1000 for implementing the workflows and process described in reference to FIGS. 1-9. Other systems are possible, including systems with more or fewer components. In some implementations, the system architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to a processor 1002 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1012 further includes an operating system 1014 (e.g., Mac OSe server, Windows® NT server), a network communication module 1016, a database application 1018, a database schema 1020 and one or more other applications 1022. The operating system 1014 can be multi-user, multiprocessing, multitasking, multithreading, real time, etc. The operating system 1014 performs basic tasks, including but not limited to: recognizing input from and providing output to the devices 1004, 1008; keeping track and managing files and directories on computer-readable mediums 1012 (e.g., memory or a storage device); controlling peripheral devices; and managing traffic on the one or more communication channels 1010. The network communications module 1016 includes various components for establishing and maintaining network connections (e.g., software for implementing communication protocols, such as TCP/IP, HTTP, etc.).

The database application 1018 implements the workflows and process described in reference to FIGS. 1-9. An example database application is the Bento™ personal database developed and distributed by FileMaker®, Inc. (Santa Clara, Calif.). The database application 1018 generates the user interfaces shown in FIGS. 1-8. One or more applications 1022 (e.g., Microsoft Excel®, Apple® Numbers) can be used to provide content to be pasted into the database application 1018 while the database application 1018 is executing on one or more processors 1002.

The system 1000 is one example of a suitable system for hosting a database application 1018 capable of dynamic creation of database schema. Other systems are possible, which include more or fewer components. The system architecture 1000 can be any device capable of hosting a database application 1018, including but not limited to: personal computers, server computers, mobile phones, email devices, etc. The system architecture 1000 can be implemented in a parallel processing or peer-to-peer infrastructure or on a single device with one or more processors. The database application 1018 can include multiple software components or can be a single body of code.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   presenting a table view in a database application executing on a computer system;
   detecting pasting of content onto the table view by a user, the table view having a number of rows and columns which are represented by a structured object located on a storage device coupled to the computer system, wherein the pasting begins at a cell of the table view;
   determining if the content to be pasted extends beyond the number of rows or columns currently presented in the table view;
   automatically adding one or more records or fields to the structured object on the storage device when it is determined that the content to be pasted extends beyond the number of rows or columns currently presented in the table view; and
   updating the table view to show one or more rows or columns corresponding to the one or more records or fields added to the structured object,
   where determining comprises:
      obtaining the content from a clipboard;
      counting a number of rows and columns of the content;
      counting a number of rows and columns in the table view starting at the cell of the table view; and
      where the cell of the table view is a location of a cursor in the table view when the paste operation is performed.

2. The method of claim 1, where the content is copied from an application executing on the computer system.

3. A non-transitory computer-readable medium having instructions stored thereon, which, when executed by a processor, causes the processor to perform operations comprising:
   presenting a table view in a database application executing on a computer system;
   detecting pasting of content onto the table view by a user, the table view having a number of rows and columns which are represented by a structured object located on a storage device coupled to the computer system, wherein the pasting begins at a cell of the table view;
   determining if the content to be pasted extends beyond the number of rows or columns currently presented in the table view;
   automatically adding one or more rows or columns to the structured object on the storage device when it is determined that the content to be pasted extends beyond the number of rows or columns currently presented in the table view; and
   updating the table view to show the one or more rows or columns added to the structured object,
   where determining comprises:
      obtaining the content from a clipboard;
      counting a number of rows and columns of the content;
      counting a number of rows and columns in the table view starting at the cell of the table view; and
      where the cell of the table view is a location of a cursor in the table view when the paste operation is performed.

4. The non-transitory computer-readable medium of claim 3, where the content is copied from an application executing on the computer system.

5. A system comprising:
   a processor;
   memory coupled to the processor and operable for storing instructions, which, when executed by the processor, causes the processor to perform operations comprising:
   presenting a table view in a database application executing on a computer system;
   detecting pasting of content onto the table view by a user, the table view having a number of rows and columns which are represented by a structured object located on a storage device coupled to the computer system, wherein the pasting begins at a cell of the table view;

determining if the content to be pasted extends beyond the number of rows or columns currently displayed presented in the table view;

automatically adding one or more records or fields to the structured object on the storage device when it is determined that the content to be pasted extends beyond the number of rows or columns currently presented in the table view; and updating the table view to show one or more rows or columns corresponding to the one or more records or fields added to the structured object, where determining comprises:

obtaining the content from a clipboard;

counting a number of rows and columns of the content;

counting a number of rows and columns in the table view starting at the cell of the table view; and where the cell of the table view is a location of a cursor in the table view when the paste operation is performed.

6. The system of claim 5, where the content is copied from an application executing on the computer system.

* * * * *